(12) United States Patent
Borra

(10) Patent No.: US 6,479,077 B1
(45) Date of Patent: Nov. 12, 2002

(54) METHOD OF MANUFACTURING POWDER PARTICLES

(75) Inventor: Jean-Pascal Dominique M Borra, Chanteloup (FR)

(73) Assignee: Technische Universiteit Delft, Delet (NL)

( * ) Notice: Subject to any disclaimer, the term of this patent is extended or adjusted under 35 U.S.C. 154(b) by 0 days.

(21) Appl. No.: 09/214,109

(22) PCT Filed: Jun. 27, 1997

(86) PCT No.: PCT/NL97/00366
§ 371 (c)(1),
(2), (4) Date: Mar. 6, 2000

(87) PCT Pub. No.: WO97/49484
PCT Pub. Date: Dec. 31, 1997

(30) Foreign Application Priority Data

Jun. 27, 1996 (NL) .............................................. 1003442

(51) Int. Cl.[7] ................................................ A61K 9/14
(52) U.S. Cl. ...................................................... 424/489
(58) Field of Search ............................ 424/45, 46, 489

(56) References Cited

U.S. PATENT DOCUMENTS

| | | | |
|---|---|---|---|
| 2,685,537 A | 8/1954 | Dunmire | |
| 4,383,767 A | 5/1983 | Jido | |

FOREIGN PATENT DOCUMENTS

| | | |
|---|---|---|
| DE | 31 26 854 | 1/1983 |
| FR | 1 360 193 | 8/1964 |

*Primary Examiner*—Jose' G. Dees
(74) *Attorney, Agent, or Firm*—Pitney, Hardin, Kipp & Szuch LLP

(57) ABSTRACT

The invention relates to a method of manufacturing a dry powder particle, preferably using electro-hydrodynamic spraying, wherein two oppositely charged aerosol streams are contacted. The invention allows for the manufacture of powders having various, controllable compositions and shapes. In particular the method according to the invention may be used to perform physical and chemical reactions and allows for the manufacture of powders not previously obtainable. In addition, the invention relates to an electrode and an apparatus for applying the method according to the invention.

22 Claims, 1 Drawing Sheet

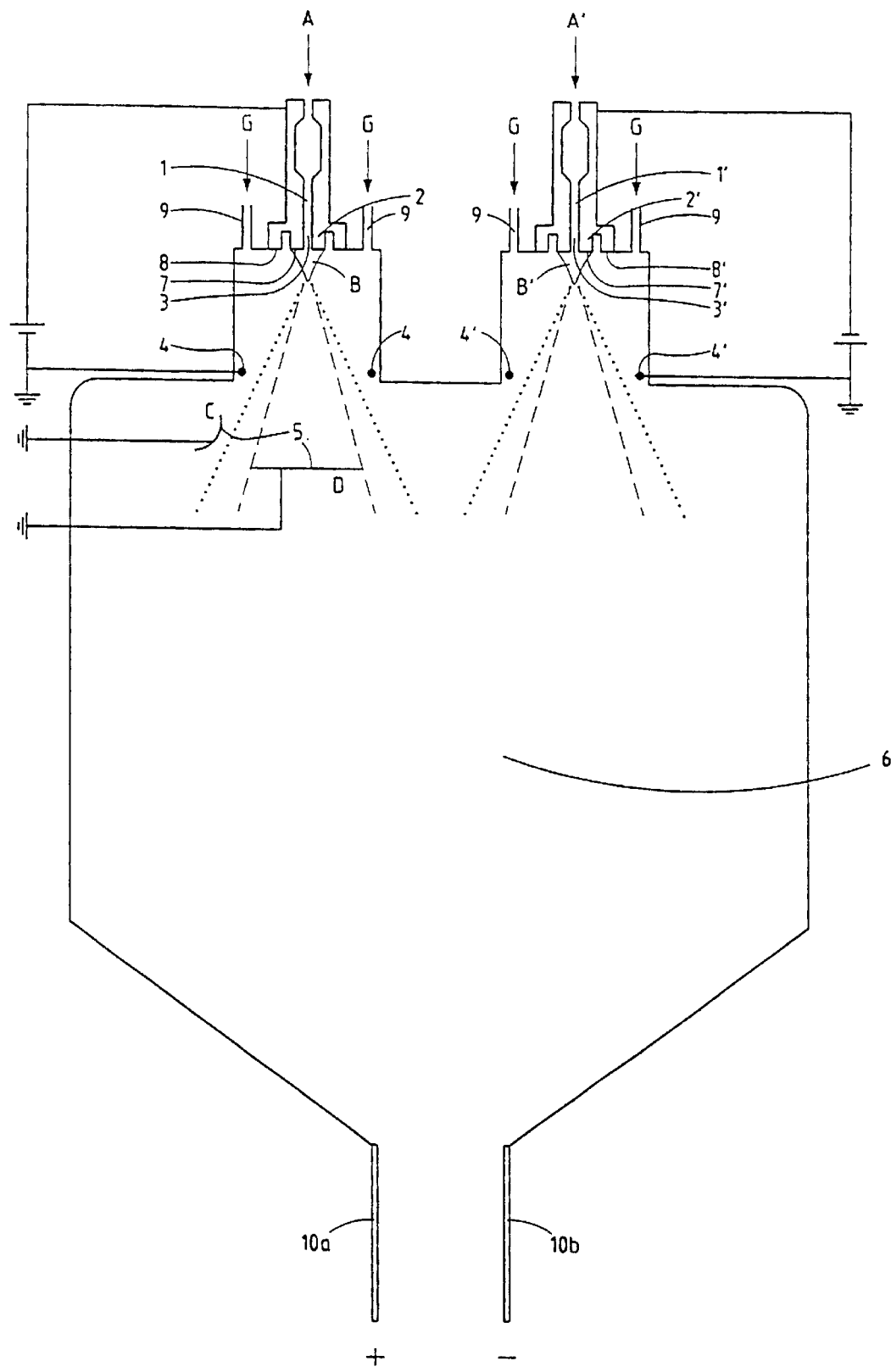

METHOD OF MANUFACTURING POWDER PARTICLES

FIELD OF THE INVENTION

This invention relates to a method of manufacturing a dry powder particle by generating a charged aerosol stream comprised of charged initially liquid particles and converting said stream into powder particles.

BACKGROUND OF THE INVENTION

Such a method is well known in the state of the art. By passing a liquid, comprising a solute dissolved in a solvent, through a narrow orifice using high voltage, a charged aerosol stream is generated comprised of charged liquid particles. Evaporation of the solvent results in a fine powder with a relatively narrow size distribution. This, process, known as electrohydrodynamic spraying, is for example suitable for the manufacture of polymeric powders used for electrostatic spraying during powder coating.

The charged powders manufactured according to the state of the art tend to form agglomerates, making them less suitable in the manufacture of high quality finished surfaces. The charged powders also tend to clog up pipelines, which interferes with both production of the powder and use thereof. Thus, the method according to the invention provides a powder having an improved industrial applicability while in addition a higher powder yield is obtained.

In the field of fuel injection it is known to study the phenomenon of mixing two aerosol fuel streams by contacting two similarly charged aerosol fuel streams. (Dunn P. F. et al. the mixing of electrically-charged droplets between and within electrohydrodynamic fine sprays, J. Aerosol Sci. vol. 25, 0.6, pp. 1213–1227, 1994).

It is also known to manufacture a homogeneous mixture by contacting charged granules with an oppositely charged powder (Thesis of P. Vercoulen; Electrostatic processing of particles. Technical University of Delft, the Netherlands). To this end a powder, comprising particles in the micron range, is sprayed and subsequently charged, for example using a corona discharge device, before being contacted with oppositely charged solid granules having diameters in the order of 2 mm. The particulate starting materials were manufactured using conventional techniques, i.e. grinding.

SUMMARY OF THE INVENTION

The objects of the present invention are to expand the application possibilities of said method, and in particular to provide a method allowing for the manufacture of powders which could not be produced so far, and to improve the quality of powders produced using said method.

To this end the method according to the invention is characterized in that the charged aerosol stream comprised of charged particles is contacted with a second aerosol stream comprising oppositely charged particles resulting into a combined aerosol stream to form the powder particle.

Electrohydrodynamic spraying allows for the generation of charged aerosol streams having well defined particle size distributions, wherein the liquid particles are charged at the instant the liquid particle is formed, i.e. the droplets do not have to be charged afterwards in a separate charging step.

DETAILED DESCRIPTION OF THE PREFERRED EMBODIMENT

Thus the present invention provides a method for the manufacture of powder particles, which together constitute a powder, which powder is comprised of less charged or substantially neutral particles. The method allows for, for example, the use of aerosol streams of different composition enabling physical and chemical reactions to occur, and for the coating of particles.

According to a preferred embodiment of the invention the amount of charge of the first aerosol stream and the amount of charge of the second aerosol stream are controlled to yield a substantially neutral powder.

Thus a higher yield of powder can be obtained than previously achievable.

According to a preferred embodiment the particles of at least the first aerosol stream comprising charged particles are generated by electrohydrodynamic spraying.

According to a preferred embodiment the first aerosol stream comprises particles comprising a solvent and a solute, said solvent being evaporated to yield a substantially dry powder particle.

This allows for the manufacture of a powder particles comprising two or more attached subunits. This method is characterized in that a part of the solvent is evaporated from the first aerosol stream to form a first aerosol stream being composed of solid, sticky charged particles which is contacted with the second charged aerosol stream comprising solid charged particles resulting in the combined aerosol stream which is converted into an essentially dry powder. Thus it is possible to make aerosol particles with a specific shape, the subunits having the same or a different composition.

A particularly preferred embodiment of the method according to the invention is characterized in that, when contacted, both the first and the second aerosol stream comprise liquid charged particles.

This embodiment allows for a multitude of physical and chemical reactions to occur.

Advantageously the method according to the invention comprises, after contacting the first aerosol stream with the second aerosol stream, separation of particles with the desired composition according to their charge to mass ratio.

As the amount of charge is proportional to the mass of the particle (or, in case of a particle comprising an evaporating solvent, to the mass of the solute), the composition of the particle is reflected in the charge to mass ratio of the particle formed.

Yet another preferred method of manufacturing a powder according to the invention is characterized in that at least the first aerosol stream, being comprised of larger particles and satellite particles, is subjected to a particle separation step providing a substantially monodisperse aerosol stream whereafter the substantially monodisperse aerosol stream is contacted with the oppositely charged aerosol stream.

This embodiment, which is especially useful with electrohydrodynamic spraying, provides for a powder to be produced having a even narrower particle size distribution. Accordingly it is preferred that both the first and the second aerosol stream are subjected to the particle separation step.

According to an advantageous embodiment, the separation step is conducted using a grounded electrode. The grounded electrode, placed near or in that part of the aerosol stream where the particles to be removed pass and more distantly spaced from the desired particles, serves as a simple and effective means to attract and remove the unwanted particles. Thus an aerosol stream enriched in the desired particles is obtained and subsequently brought into contact with the oppositely charged aerosol stream.

The invention also relates to powder comprising ceramic precursor powder particles, polymer-comprising powder particles or powder particles comprising a pharmaceutical compound, for example coated powder particles, as well as a pharmaceutical composition comprising such a pharmaceutical compound-comprising powder together with a pharmaceutically acceptable carrier or diluent.

Moreover the invention relates to a method of manufacturing a ceramic product characterized in that a ceramic precursor powder according to the invention is sintered.

The method allows for the manufacture of very fine ceramic precursor powders without grinding as well as powders with compositions which until now could not be obtained or only with great difficulty. If the above mentioned separation step is performed, providing two aerosol streams comprised of satellite droplets, highly desired ceramic precursor nanoparticles can be obtained, suitable for defect free ceramic products.

Finally, the invention relates to an apparatus for working the method according to the invention, comprising an electrode having an inlet and an outlet, a channel connecting the inlet and the outlet, the outlet being an orifice in the centre of an electrically conducting area opening into a chamber, wherein the electrically conducting area is defined by a barrier, said barrier preventing the flow of liquid beyond the electrically conducting area and the chamber having a counter electrode as well as an exhaust opening for a product formed by electro-hydrodynamic spraying.

The apparatus is characterized in that the chamber is a mixing chamber and the apparatus is provided with a second electrode having an orifice opening into the chamber.

The invention will be hereinafter explained in more detail with reference to the drawing, in which the only FIGURE represents a schematic cross sectional view of an apparatus for working the method according to the invention.

The present invention provides a method for contacting a first charged aerosol stream comprised of charged particles with a second aerosol stream comprised of oppositely charged particles in a mixing zone resulting into a combined aerosol stream which is subsequently converted into a powder. Particles making up an aerosol stream have a diameter of 100 $\mu$m or less—usually in the micron range.

Advantageously the first charged aerosol stream is generated using electrohydrodynamic spraying, which method is well known in the art. A liquid A is passed via a channel 1 through a narrow orifice 2, for example with a diameter of 0.2 mm, of a nozzle 3. A high voltage, typically 5–30 kV is supplied over the nozzle 3 and an annular grounded counter electrode 4. The high voltage accelerates the liquid A through channel 1 and towards the annular counter electrode 4. At the orifice 1 a liquid jet B emerges which breaks up into charged droplets forming a conical stream of droplets having narrow size, charge density and velocity distribution. Because of their initial speed the droplets do not encounter the counter electrode 4. During the breaking up process smaller droplets, known as satellite droplets, are created as well, resulting in a bi-modal particle size distribution. These satellite droplets, being very small, end up in the outer periphery of the conical aerosol stream.

If desired it is possible to eliminate one of both types of droplets by suitably placing a grounded electrode 5 near its path, for example in position C for the removal of the satellite droplets or in position D for the removal of the larger droplets.

The charged aerosol stream comprised of charged droplets is contacted with an oppositely charged second aerosol stream in a mixing zone 6. This second aerosol stream may be comprised of liquid particles, i.e. droplets, or solid particles.

Due to the opposite charge of the particles of each aerosol stream, the particles of the different aerosol streams are attracted to each other and combine, forming less charged and even neutral particles.

Advantageously the amount of charge of the first aerosol stream and the amount of charge of the second aerosol stream are controlled to yield a neutral powder. This can be achieved in several ways, two of which are discussed. Firstly, the amount of charge per second of the first aerosol stream should be equal to the amount of charge per second of the second aerosol stream. Secondly, if one of the streams consists of very many fine particles in comparison to the particles of the other stream, many fine particles will be needed to neutralize a large particle, allowing accurate neutralization of the large particle. Thus it may be possible to increase the yield of neutral particles. An aerosol stream comprising very small particles may be obtained exploiting the Rayleigh break-up phenomenon, which occurs when the charge density in a particle becomes too high, due to evaporation of a solvent. The very fine particles may be used in excess, the surplus being wasted. To waste the surplus, a charged electrode may be used and advantageously the very fine particles consist of a volatile solvent only.

Mixing of the aerosol streams can be enhanced by supplying a gas G, usually an inert gas, to the mixing zone 6 where the first and the second aerosol stream are contacted. The gas flow also provides a convenient way to carry off the powder formed. The gas G may be supplied through inlets 9 and prevents space charge accumulation in front of the nozzles 3, which would result in an increase in electrical field intensity and unstable aerosol streams.

The method according to the invention results in a powder comprised of less charged or substantially neutral particles. Charged product particles may be removed using a grounded electrode yielding a product stream of substantially neutral particles, or classified according to their charge to mass ratio using charged electrodes 10*a*, 10*b*. Such a separation may be very valuable, for example to select particles with a desired composition. The manufacture of powders of various composition will be discussed below.

As stated earlier, the second aerosol stream may be comprised of liquid particles, i.e. droplets, or solid particles. If the second aerosol stream is comprised of solid particles these may have been charged tribologically or by using for example a corona discharge device. However, preferably the second aerosol stream is generated (both for solid and liquid particles) using electrohydrodynamic spraying as well, as shown in the figure, wherein parts indicated with reference numerals with an apostrophe correspond to those mentioned above having the same number. Using a solute-containing liquid, evaporation of the solvent before contacting the stream results in charged solid particles quickly and efficiently.

If the first aerosol stream is composed of liquid particles while contacting the second aerosol stream, it is possible to manufacture coated particles. Coated particles are for example of interest in the manufacture of pharmaceutical compositions, for example for the quick, delayed or sustained release of a pharmaceutically active compound. When it is desired to coat a liquid particle, it may be necessary to incorporate a surfactant.

Contacting the first charged aerosol stream with a second charged aerosol stream of liquid particles opens a whole range of possibilities to manufacture particles with various composition.

According to a preferred embodiment the liquid of the first aerosol stream comprises a first agent and the liquid of the second aerosol stream comprises a second agent. Thus it is possible to perform many physical and chemical reactions in very tiny droplets.

For example, if the liquids of the first and the second aerosol stream are miscible, homogeneous physical or chemical processes may occur in each newly formed droplet. If the liquids are immiscible heterogeneous processes may occur. Typical physical processes include precipitation and crystallization processes. Thus the method according to the invention may, for example, result in particles each comprising an amorphous mixture of compounds which were originally present in each of the aerosol streams, or a crystal. In this way it is for example possible to manufacture ceramic precursor powders. Amongst the ceramic precursor powders those for the manufacture of high temperature superconductors can be mentioned.

A potentially useful embodiment comprises contacting a water miscible organic solvent comprising a not or sparingly water soluble polymer with an oppositely charged aqueous aerosol stream, the water causing the polymer to precipitate. Another simple way to obtain a precipitate is by using an alkaline and acid liquid for the respective aerosol streams, if the solubility of the solute is pH dependent.

A preferred embodiment of the method according to the invention is characterized in that the liquid of the first aerosol stream comprises a first reagent and the liquid of the second aerosol stream comprises a second reagent and the reaction comprises a chemical reaction. In the present application the term "reagent" includes chemical or biological catalysts, for example an enzyme.

Due to chemical reactions the product particle may contain a new compound. The chemical reaction may be virtually any chemical reaction, for example a polymerisation reaction.

In case of a heterogeneous reaction, the invention allows for the preparation of compounds which can not be obtained efficiently by mixing the liquids in bulk, for example due to the formation of a solid reaction product preventing the remaining reagents from reacting.

The invention also relates to an electrode, suitable for use with the method according to the invention employing electrohydrodynamic spraying, having an inlet and an outlet, a channel connecting the inlet and the outlet, the outlet being an orifice in the centre of an electrically conducting area 7, wherein the electrically conducting area 7 is defined by a barrier, said barrier preventing the flow of liquid outside the electrically conducting area 7.

According to the invention the electrode is characterized in that the electrically conducting area 7 is surrounded by a second area 8 of electrically conducting material, extending outwardly over at least 1 mm in radial direction from said barrier, preferably over a distance of at least half of the radius of the first area.

Thus a more homogenous electric field is generated, with a reduced radial component of the electrical field, near the nozzle 3. This is very important to avoid electrical discharges which would result in disturbed mixing of the first and second aerosol stream. The use of said electrode improves the size, charge density and velocity distribution of an aerosol stream generated using said electrode. In addition the electrode allows for the use of liquids with higher conductivities than with electrodes according to the state of the art.

The barrier may be, as shown in the figure, a steep recess, the wall thereof being for example at an angle of 90° with the first area. Preferably the first and second area lie in the same plane. Advantageously they are electrically connected.

It should be clear from the above, that the method according to the invention can be used to manufacture, a powder consisting of less charged or substantially neutral particles wherein each particle contains each of the compounds used, or a powder consisting of particles comprising a compound not present in the starting materials.

The present invention allows for the manufacture of powders which were previously only obtainable using emulsion techniques, which require the evaporation/removal of the solvent, making the techniques cumbersome and expensive.

The invention may also be used to control the size, structure and shape of the particles that make up the powder. By controlling the rate of evaporation of a solvent used, the person skilled in the art can achieve powders of, for example, porous, hollow or massive particles. Porous or amorphous particles may find application as catalysts. For coated particles, the thickness of coatings can be controlled by suitable choice of the solute concentration and droplet size. The rate of evaporation can be controlled by a suitable choice of solvent, heating (micro-wave, gas supplied at a particular temperature), suitable choice of the aerosol streams etc., as is well known by the person skilled in the art.

It will be appreciated that the present invention, as claimed in the appended claims, can be worked in several ways, as will be obvious for the person skilled in the art. For example, if mention is made of a liquid, the liquid may also comprise a molten solid. It is possible to improve the size distribution of an aerosol stream by, for example, superposing a high frequency alternating voltage on top of the constant voltage.

Rayleigh-break up may be used to generate droplets even smaller than satellite droplets and thus allow for the manufacture of extremely fine powders. Preferably a separation step is carried out before the aerosol stream generated is contacted with the second aerosol stream, as described above.

Apart from those already mentioned, the powders according to the invention will have many other uses, for example for calibration purposes and as seed material.

For scaling up the method according to the invention, an array of nozzles can be used, for example rows of nozzles with alternating a row for positively charged aerosol streams and a row for negatively charged aerosol streams. Advantageously, the nozzles are supplied with liquid from one supply, or in case of different liquids from two supplies only, and likewise the voltage can be supplied using one power supply for each polarity only.

The apparatus according to the invention may be provided with a moving counter electrode and/or electrode for the removal of charged particles, for example realised as a conveyor belt. Any particles adhering to the electrode are removed outside the mixing zone, for example outside the chamber, and are—depending on the type of powder formed—reused or disposed of.

What is claimed is:

1. Method of manufacturing powder particles comprising:
   (a) generating a first aerosol stream of charged liquid particles,
   (b) generating a second aerosol stream of charged particles,
   (c) contacting at least one particle in the first aerosol stream with at least one particle in the second aerosol stream to form powder particles different from the at least one particle in the first aerosol stream and the at least one particle in the second aerosol strewn; and (d) separating a powder particle from the powder particles according to charge to mass ratio of the powder particles by subjecting the powder particles to an electric field.

2. Method of manufacturing powder particles according to claim 1, wherein the first aerosol stream is comprised of liquid particles comprising a solvent and a solute.

3. Method of manufacturing powder particles according to claim 2, comprising evaporating the solvent after contacting the at least one particle in the first aerosol stream with at least one particle in the second aerosol stream.

4. Method of manufacturing powder particles according to claim 3, wherein both the first and the second aerosol stream comprise liquid charged particles.

5. Method of manufacturing powder particles according to claim 4, wherein the first aerosol stream is generated using a liquid which is miscible with the liquid used to generate the second aerosol stream, and further comprises reacting the at least one particle in the first stream with the at least one particle of the second stream.

6. Method of manufacturing powder particles according to claim 4, wherein the first aerosol stream is generated using a liquid which is immiscible with the liquid used to generate the second aerosol stream, and further comprising reacting the at least one particle in the first stream with the at least one particle of the second stream.

7. Method of manufacturing powder particles according to claim 5, wherein the liquid of the first aerosol stream comprises a first reagent and the liquid of the second aerosol stream comprises a second reagent and further comprising chemically reacting the at least one particle in the first stream with the at least one particle in the second stream.

8. Method of manufacturing powder particles according to claim 6, wherein the liquid of the first aerosol stream comprises a first reagent and the liquid of the second aerosol stream comprises a second reagent and further comprising chemically reacting the at least one particle of the first stream with the at least one particle of the second stream.

9. Method of manufacturing powder particles according to claim 1, wherein at least the first aerosol stream comprises larger particles and satellite particles, further comprising subjecting the first stream to a particle separation step providing a substantially monodisperse aerosol stream whereafter the substantially monodisperse aerosol stream is contacted with the second aerosol stream.

10. Method of manufacturing powder particles according to claim 9, wherein both the first and the second aerosol stream are subjected to the particle separation step.

11. Method of manufacturing powder particles according to claim 9, wherein the separation step comprises removing particles from the stream using a grounded electrode.

12. Method of manufacturing powder particles according to claim 10, wherein the separation step comprises removing particles from the stream using a grounded electrode.

13. Method of manufacturing powder particles according to claim 3, comprising evaporating the solvent from the first aerosol stream to form a first aerosol stream comprising solid, sticky charged particles.

14. Method of manufacturing a powder particle according to claim 1 wherein substantially neutral particles are separated from substantially charged particles.

15. A powder comprising ceramic precursor powder particles manufactured according to claim 1.

16. A powder comprising polymer-comprising particles manufactured according to claim 1.

17. A powder comprising a pharmaceutical compound-comprising powder particle manufactured according to claim 1.

18. A powder according to claim 17, wherein the pharmaceutical compound comprising powder particle is a coated powder particle.

19. A powder according to claim 17, wherein the powder comprises catalyst-comprising powder particles.

20. A method of manufacturing a powder according to claim 15, wherein the ceramic precursor powder is sintered.

21. Pharmaceutical composition comprising a powder comprising at least one pharmaceutically active compound, wherein the powder is a powder according to claim 17, together with a pharmaceutically acceptable carrier or diluent.

22. Pharmaceutical composition comprising a powder comprising at least one pharmaceutically active compound, wherein the powder is a powder according to claim 18, together with a pharmaceutically acceptable carrier or diluent.

* * * * *